Figure 1:
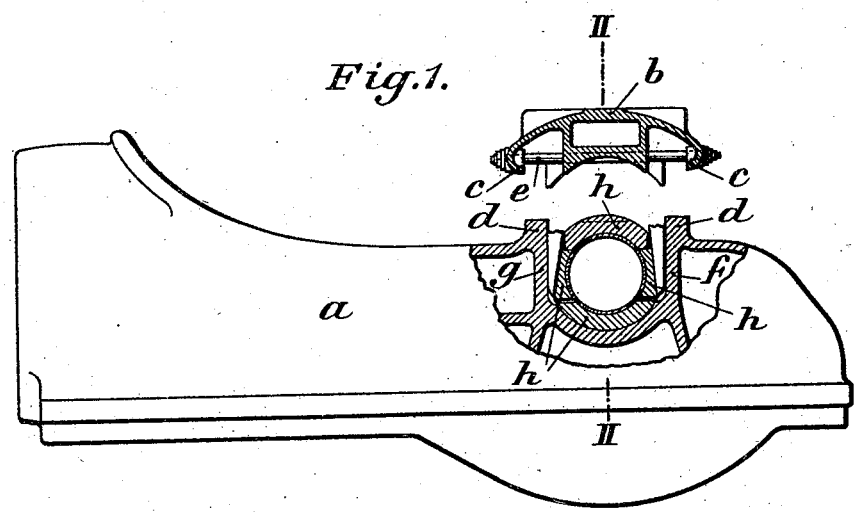

E. KÄGI.
FRAME BEAM FOR HORIZONTAL ENGINES.
APPLICATION FILED DEC. 16, 1919.

1,419,858. Patented June 13, 1922.

INVENTOR
Emil Kägi
BY Chas. J. O'Neill
atty.

UNITED STATES PATENT OFFICE.

EMIL KÄGI, OF WINTERTHUR, SWITZERLAND.

FRAME BEAM FOR HORIZONTAL ENGINES.

1,419,858.  Specification of Letters Patent.  Patented June 13, 1922.

Application filed December 16, 1919. Serial No. 345,205.

*To all whom it may concern:*

Be it known that EMIL KÄGI, engineer, a citizen of Switzerland, residing at and whose post-office address is Winterthur, Switzerland, Breitestrasse 34, have invented certain new and useful Improvements in Frame Beams for Horizontal Engines, of which the following is a specification.

This invention relates to frame beams for large horizontal engines and more especially to the construction of the particular portion of the body of the crank shaft bearing which is connected with the actual frame beam and situated beneath the upwardly turned bearing recess in the beam. To provide for the high stresses on this part, which has to take the entire thrust of the piston rod, a strengthening of the bearing body by increasing its size, or by means of draught rods or the like that tie it to the rear part of the frame beam, has been proposed. But up to the present the means proposed for the solution of this problem have not been satisfactory. The invention contemplates the strengthening the body of the bearing in a most simple manner by providing the cover of the crank shaft bearing with tie rods that may be made in the form of screw-bolts extending across the crank shaft, i. e. in the direction of the thrust of the piston rod, and tying the front part of the body of the crank shaft bearing to the rear portion of the frame beam.

A manner of carrying out the invention is illustrated in the drawing in which—

Figure 2:
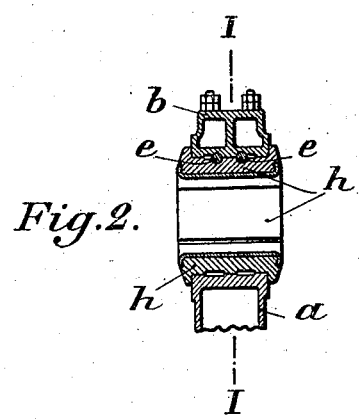

Fig. 1 shows a side elevation of the frame beam partly in section on the line I—I of Fig. 2 and Fig. 2 represents a section on the line II—II of Fig. 1.

$a$ is the frame beam and $b$ the bearing cover provided with jaws $c$ that are adapted to receive the upwardly extending projections $d$ of the frame beam. The bearing cover $b$ with its bolts $e$ connects the front part $f$ of beam frame or of the housing of the crank shaft bearing with the rear part $g$ of the same. $h$ denotes the bearing brasses. The screw bolts $e$ are tightened only after the cover has been placed on the bearing.

Apart from its simplicity a great advantage of the above described design over the known types belonging to this category is that the brasses $h$ may be taken out without removing the means employed for strengthening the frame beam as in the case of the said known types. The invention may be applied to large gas engines or to engines of any other type.

I claim:

1. In a crank shaft bearing construction for horizontal engines and the like, the combination with an engine frame beam, of a housing for said bearing, a bearing cover or cap adapted to fit over and embrace the open portion of said housing, and a tie rod arrangement connecting the opposite ends of said cover and also adapted to tie together the open portions of said housing and clamp said cover in operative position.

2. In a crank shaft bearing construction for horizontal engines and the like, the combination with an engine frame beam, of a housing for said bearing, a bearing cover or cap adapted to fit over and embrace the open portion of said housing, and tie rods arranged transversely of the cover connecting the ends of said cover and also adapted to tie together the open portions of said housing and clamp said cover in operative position.

3. In a crank shaft bearing construction for horizontal engines and the like, the combination with an engine frame beam, of a housing for said bearing, said housing provided with upwardly extending side flanges adjacent the open portion thereof, a bearing cover or cap having downwardly projecting end portions adapted to fit over and embrace said upwardly extending side flanges of the housing, and transversely disposed tie rods carried by said cover connecting the downwardly projecting end portions thereof and also adapted to tie together the upwardly extending side flanges of said housing and clamp said cover in operative position.

In testimony whereof I have affixed my signature in presence of two witnesses.

EMIL KÄGI.

Witnesses:
OLLY M. AURIG,
AUGUST LUEGG.